United States Patent [19]

Motles

[11] Patent Number: 5,095,444
[45] Date of Patent: Mar. 10, 1992

[54] SYSTEM AND METHOD FOR MEASURING INTER-NODAL TRANSMISSION DELAYS IN A COMMUNICATIONS NETWORK

[75] Inventor: Luis Motles, Pittsburgh, Pa.
[73] Assignee: Legent Corporation, Pittsburgh, Pa.
[21] Appl. No.: 454,225
[22] Filed: Dec. 21, 1989
[51] Int. Cl.⁵ .......................... G06F 15/20; H04J 1/16
[52] U.S. Cl. .................................... 364/514; 340/527; 370/13; 395/200; 395/550
[58] Field of Search ..................... 364/514, 200, 240.9, 364/241, 265.1, 269.4, 919, 900, 937, 942.06, 242.9, 271.5, 284.4, 221.7, 921.9, 940.62, 950.4; 370/13, 14; 340/527

[56] References Cited

U.S. PATENT DOCUMENTS

| | | | |
|---|---|---|---|
| 4,412,281 | 10/1983 | Works | 364/200 |
| 4,631,666 | 12/1986 | Harris et al. | 364/200 |
| 4,633,411 | 12/1986 | Bliss et al. | 364/514 |
| 4,748,660 | 5/1988 | Deveze | 364/514 |
| 4,771,391 | 9/1988 | Blasbalg | 364/514 |
| 4,789,948 | 12/1988 | von der Embse | 364/514 |
| 4,807,118 | 2/1989 | Lin et al. | 364/200 |
| 4,912,656 | 3/1990 | Cain et al. | 364/514 |
| 4,918,623 | 4/1990 | Lockitt et al. | 364/514 |

OTHER PUBLICATIONS

Waclawsky et al., IBM Technical Bulletin–"VR Performance and Window Size Tuning", dated Oct. 1987; Sec. 5.1 (pp. 15–17) & Sec. 6.3.3 (pp. 64–65).

Primary Examiner—Joseph L. Dixon
Attorney, Agent, or Firm—Kirkpatrick & Lockhart

[57] ABSTRACT

A system for measuring inter-nodal transmission delays in a communications network interconnecting a source node, a destination node and a plurality of intermediate nodes requests a response from the destination node, receives a response from the destination node and then determines both an issue time at which the request is issued by the source node and a receipt time at which the response is received by the source node. A transmission delay between the source node and the destination node is deterined by calculating a difference between the issue time and the receipt time.

14 Claims, 3 Drawing Sheets

SYSTEM AND METHOD FOR MEASURING INTER-NODAL TRANSMISSION DELAYS IN A COMMUNICATIONS NETWORK

BACKGROUND OF THE INVENTION

1 Field of the Invention

The present invention is directed generally to monitoring the performance of communications networks and more specifically to measuring inter-nodal transmission delays in a communications network.

2. Description of the Prior Art

The efficient functioning of communications networks is becoming increasingly important to the efficient functioning of large computer systems. Consequently, the ability to measure response times and the ability to determine the causes of communications network transmission delays are becoming increasingly important. There are currently several products in the marketplace that measure end-to-end response time. End-to-end response time is a measure of the communications network delay that is incurred in transmitting data between a host computer system and a user terminal. End-to-end response time does not, however, identify the causes of transmission delays. Accordingly, the need exists for a product that will determine the causes of poor end-to-end response time by providing measures of the transmission delays in the various links in the communications network.

SUMMARY OF THE INVENTION

The present invention is directed to a system for measuring transmission delays in a communications network interconnecting a source node, a destination node and a plurality of intermediate nodes such that a communications path between the source node and the destination node including any intermediate nodes forms a route. The system includes means for requesting a response from the destination node, means for receiving a response from the destination node, means for determining an issue time at which the request is issued by the source node and means for determining a response time at which the response is received by the source node. A transmission delay between the source node and the destination node is determined by calculating a difference between the issue time and the response time. An intermediate transmission delay between any two adjacent intermediate nodes or between an intermediate node and an adjacent destination node is determined by calculating a difference between the transmission delay between the source node and one of the adjacent nodes and the transmission delay between the source node and the other of the adjacent nodes.

The present invention is also directed to a method for measuring transmission delays in a communications network interconnecting a source node, a destination node and a plurality of intermediate nodes such that a communications path between the source node and the destination node including any intermediate nodes forms a route. The method comprises the steps of requesting a response from the destination node, receiving a response from the destination node, determining an issue time at which the request is issued by the source node, determining a response time at which the response is received by the source node and determining, in response to the issue time and the response time, a transmission delay along the route.

The system and method for measuring inter-nodal transmission delays in a communications network provides the means for determining the causes of poor end-to-end response time by providing measures of the transmission delays in the various links in the communications network. This information is necessary for the efficient and reliable operation of complex communications networks. These and other advantages and benefits of the present invention will become apparent from the description of a preferred embodiment hereinbelow.

BRIEF DESCRIPTION OF THE DRAWINGS

In order that the present invention may be clearly understood and readily practiced, preferred embodiments will now be described, by way of example only with reference to the accompanying figures wherein.

DETAILED DESCRIPTION OF THE PREFERRED EMBODIMENT

Figure 1:
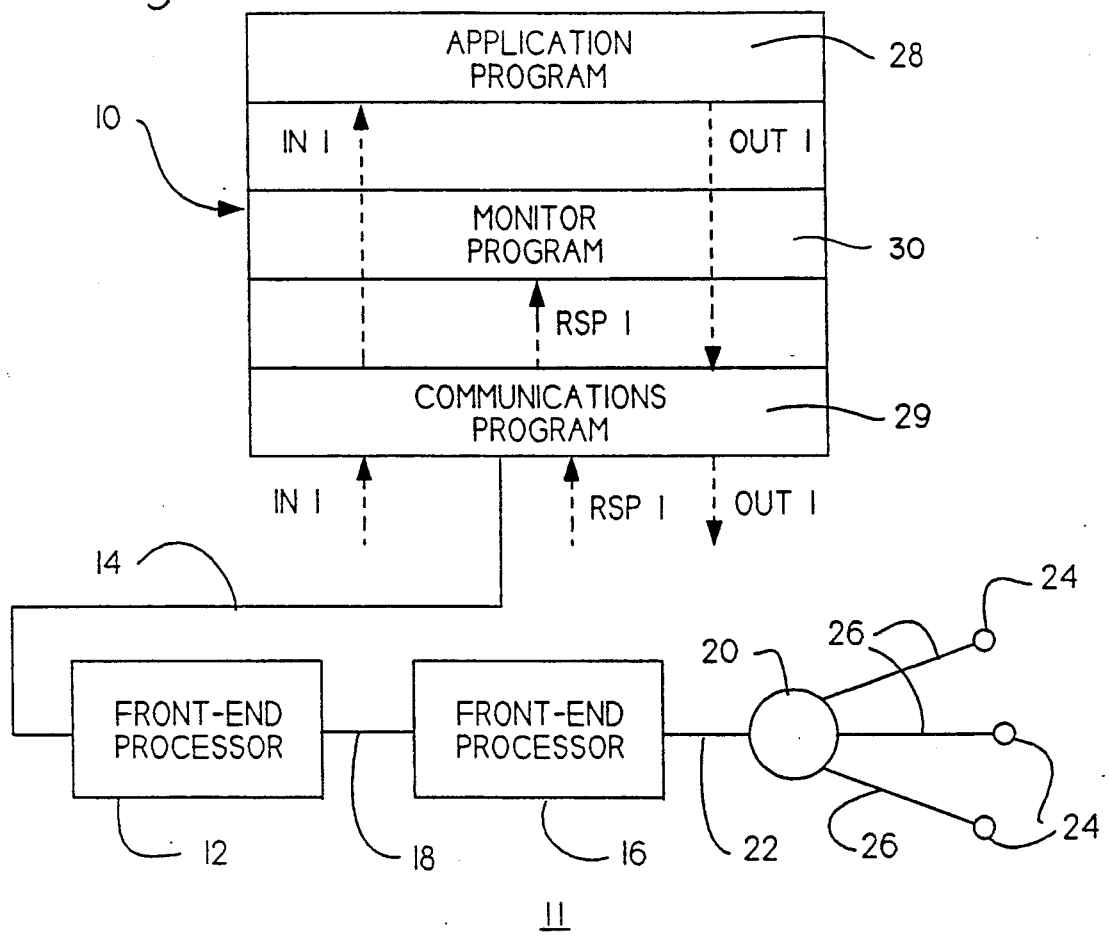
FIG. 1 illustrates a simplified representation of a typical communications network in which the system and method of the present invention for measuring inter-nodal transmission delays may be employed.

FIG. 1 illustrates a simplified representation of a typical communications network 11 in which the system of the present invention for measuring inter-nodal transmission delays may be employed. Like reference numerals are employed among the various figures to designate like elements. A host computer 10 is connected to a front-end processor 12 by means of host channel 14. The host channel 14 acts as an inter-nodal communications link in the communications network 11 of FIG. 1. Front-end processor 12 is similarly connected to a remote front-end processor 16 by means of inter-nodal communications link 18. Remote front-end processor 16 is in communication with cluster controller 20 by means of communications link 22. A number of user terminals 24 are connected to cluster controller 20 by means of coaxial cables 26.

In the communications network 11 of FIG. 1, the host computer 10 transmits a data stream OUT1 to one of the user terminals 24. The data stream OUT1 must traverse the host channel 14 connecting the host computer 10 with the front-end processor 12, the inter-nodal communications link 18 connecting the front-end processor 12 with the remote front-end processor 16 and the communications link 22 connecting remote front-end processor 16 with the cluster controller 20. The coaxial cables 26 can be ignored for purposes of measuring transmission delays because the delays experienced in these cables 26 are negligible compared to the delays experienced in other portions of the communications network 11. Data stream IN1 is similarly transmitted, in the opposite direction, from one of the user terminals 24 to the host computer 10. Thus, the data streams IN1 and OUT1 may experience transmission delays in the host channel 14, the front-end processor 12, the inter-nodal communication link 18, the remote front-end processor 16, the communications link 22 and the cluster controller 20.

The host computer 10 will include one or more application programs 28 which exchange data streams IN1 and OUT1 with a user terminal 24. This data exchange is managed by communications program 29 also residing in the host computer 10. Data stream OUT1 is passed from the application program 28 to the communications program 29. Data stream OUT1 is then transmitted through the communications network 11 to user terminal 24 by communications program 29. Data stream IN1 is transmitted from the user terminal 24 through the communications network 11 to the communications program 29 and then passed from the communications program 29 to the application program 28.

A monitor program 30 which embodies the system and method of the present invention also resides in the host computer 10 and acts to intercept data streams IN1 and OUT1 which are exchanged between the application program 28 and the communications program 29. Monitor program 30 is a memory (not shown) resident program. Those skilled in the art will recognize that the details of the monitor program 30 will vary with such things as the design of the host computer 10 and the communications program 29. Typically, the addresses of communications program 29 routines that handle incoming and outgoing data streams IN1 and OUT1, respectively, are contained in communications program 29 control blocks (not shown). The monitor program 30 will replace those addresses with addresses that point to itself. The monitor program 30 then ensures that it passes data streams IN1 and OUT1 to the proper communications program 29 routines.

One function of the front-end processor 12 shown in FIG. 1 is to receive data stream OUT1 from the host computer 10 and to transmit this data stream OUT1 to the remote front-end processor 16. One function of the remote front-end processor 16 is to receive data stream OUT1 from the front-end processor 12 and transmit this data stream OUT1 to the cluster controller 20. Similarly, remote front-end processor 16 receives data stream IN1 from the cluster controller 20 and transmits data stream IN1 to front-end processor 12. Front-end processor 12 then transmits the data stream IN1 to the host computer 10.

A virtual route can be defined as a logical connection between two communications network 11 nodes. Host computer 10 and front-end processors 12 and 16 are the network nodes illustrated in FIG. 1. A network node when transmitting data may be designated as a source node. Host computer 10 may function as a source node. A network node to which a cluster controller 20 is connected and when receiving data may be designated as a destination node. Front-end processor 16 may function as a destination node. The virtual route is based on the physical route that connects a source node to a destination node. In FIG. 1, a virtual route between the host computer 10 (the source node) and remote front-end processor 16 (the destination node) includes host channel 14, front-end processor 12 and inter-nodal communications link 18. Any network node which is included in a virtual route but is not either the source node or the destination node is an intermediate node. In FIG. 1, front-end processor 12 is an intermediate node. In communications networks other than the communication network 11 illustrated in FIG. 1, either the destination node or the intermediate node may be a host computer as well as a front-end processor. Also, any number of intermediate nodes may be included in the virtual route.

A technique called virtual route pacing is a mechanism which may be used in a communications network 11 to ensure that internal data buffers (not shown) of the destination node (front-end processor 16) are not overflown with data being transmitted through the communications network 11. Data streams IN1 and OUT1 are each comprised of a variable number of data buffers. The virtual route pacing mechanism permits only a fixed number of data buffers, called the window size, to be transmitted from a particular source node to a particular destination node before a request for a response must be issued from the source node and acknowledged by the destination node. A set of data buffers of a number equal to the window size is called a window. The request for a response is transmitted as part of any one of the outgoing data buffers composing outgoing data stream OUT1. In order to continue transmission of data, a response to the request, illustrated as RSP1 in FIG. 1, must be received from the destination node by the source node prior to exhausting all of the data buffers in a window. Only one request for a response may be pending at any given time on any particular virtual route. Because only one request may be pending for a given virtual route, any incoming response RSP1 can only be matched with the last request for a response that has been transmitted.

The action that the destination node takes upon reception of a request for a response depends on the implementation environment and on whether the destination node is a front-end processor 12 or 16 or a host computer 10. A front-end processor 12 or 16, when acting as a destination node, will check its internal buffer availability. If the number of internal buffers (not shown) available is less than a "slow-down point" number, which is user definable, the front-end processor 12 or 16 will hold the response RSP1 until a number of internal buffers (not shown) greater than the "slow-down point" number have become available. Similarly, a host computer 10 when acting as a destination node will attempt to allocate enough internal buffers (not shown) to send the response RSP1. The host computer 10 will not send a response RSP1 until an adequate number of internal buffers (not shown) become available. It is in this way that the control of flow of data through the communications network 11 is maintained.

Another technique for controlling the flow of data through the communications network 11 is called session level pacing. Before a user terminal 24 and application program 28 can communicate in communications network 11, the application program 28 and one of the user terminals 14 must be logically connected by a session. Session level pacing ensures that the session partners, the application program 28 and the user terminal 24, do not transmit more data buffers than the other can accommodate. The cluster controller 20 manages all data transmissions to and from user terminal 24. When session level pacing is implemented, both partners, the application program 28 and the user terminal 24, agree as to how many data buffers can be transmitted by the application program 28 to the user terminal 24 before requesting an acknowledgment that the user terminal 24 is ready to receive more data buffers. The request for a response in the session level pacing environment is transmitted in a manner similar to that used in the virtual route pacing technique.

Session level pacing is an optional mechanism that the session partners agree upon at the time of session establishment. When using the session level pacing technique in some environments, the monitor program 30 may be required to modify an outgoing data stream OUT1 in order to request a response. This modification may include setting a bit in a message header (not shown) in outgoing data stream OUT1. The number of outgoing data streams OUT1 so modified may be chosen so as to obtain a good statistical sampling of communications delays.

Session level pacing is a two-stage process. Pacing occurs between the source node (host computer 10 in FIG. 1) and the destination node (remote front-end processor 16 in FIG. 1) and then between the remote front-end processor 16 and the cluster controller 20. This mechanism provides control of the flow of data to both the remote front-end processor 16 and the cluster controller 20 so that the internal buffers (not shown) of either the remote front-end processor 16 or the cluster controller 20 are not overflown. The pacing response RSP1 from the remote front-end processor 16 provides a measurement of network delays between the host computer 10 and the remote front-end processor 16. These network delays are calculated for each session and accumulated for the virtual route utilized by these sessions.

Figure 2:
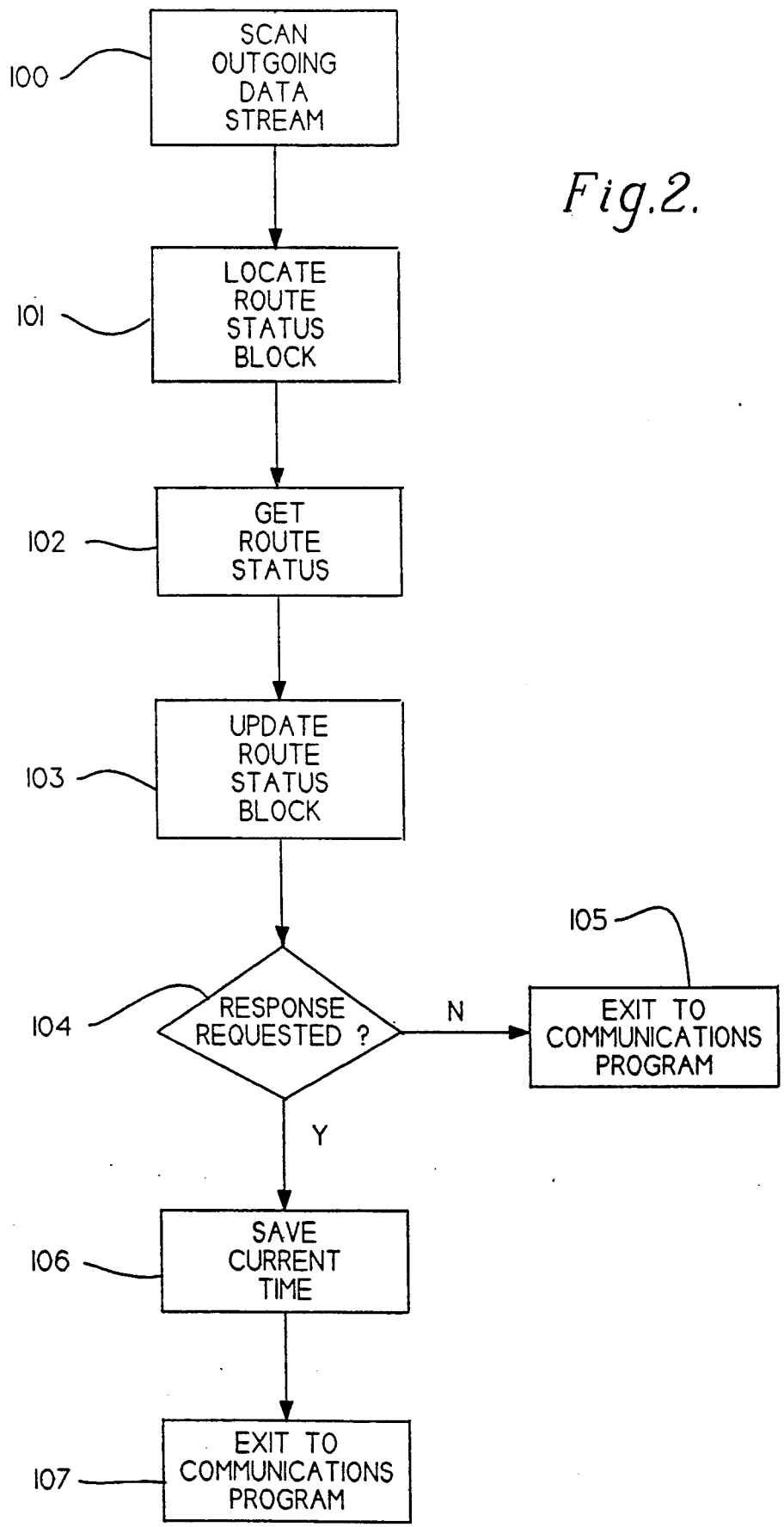
FIG. 2 illustrates a flowchart for a system and method for measuring inter-nodal transmission delays in a communications network constructed according to the teachings of the present invention.
Figure 3:
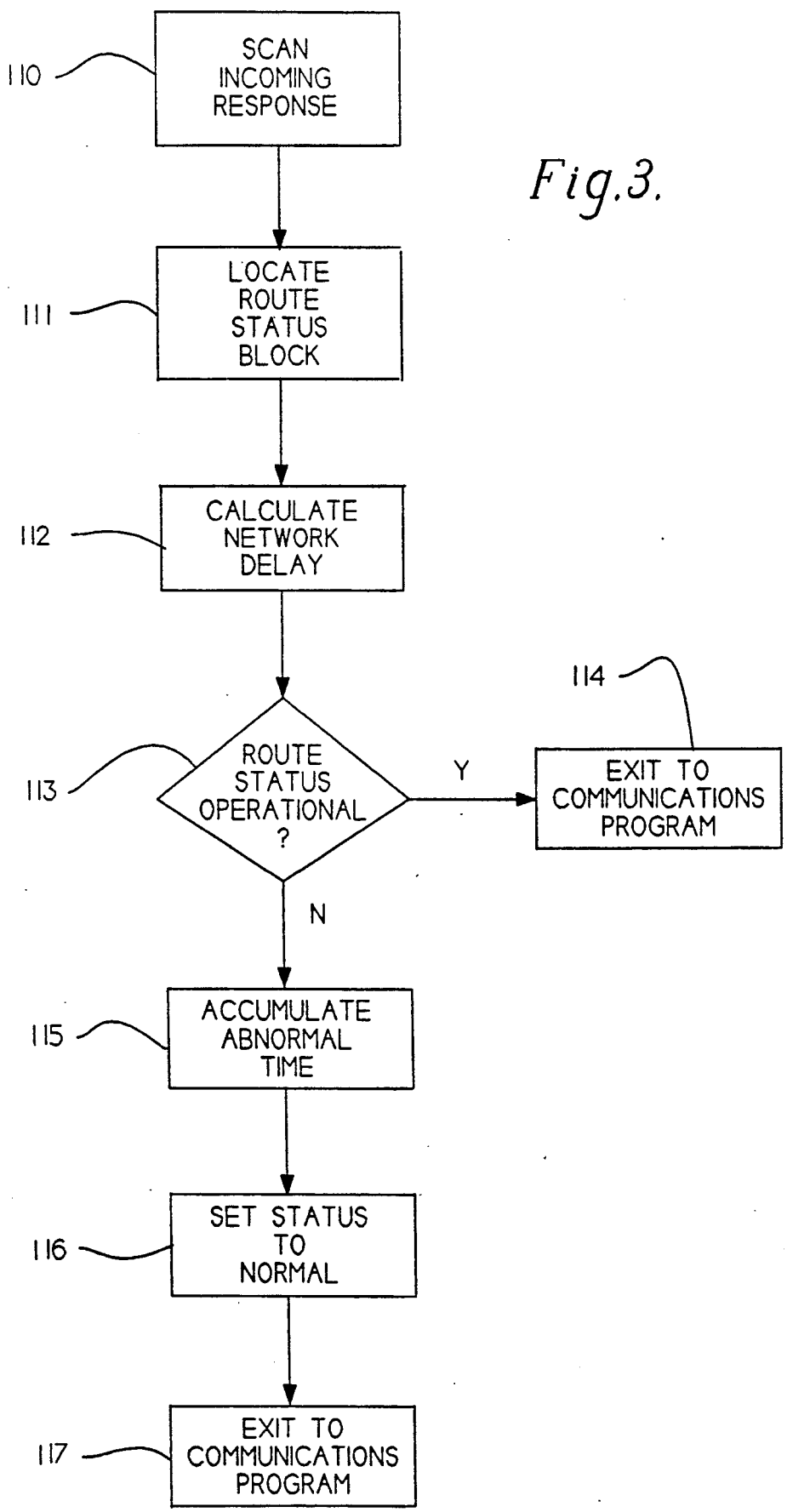
FIG. 3 illustrates a flowchart for a system and method for measuring inter-nodal transmission delays in a communications network constructed according to the teachings of the present invention.

The operation of the monitor program 30 of FIG. 1 may be implemented as illustrated in the flow charts of FIGS. 2 and 3. The processing of outgoing data stream OUT1 of FIG. 1 is illustrated in FIG. 2. The monitor program 30, in step 100, scans a message header (not shown) of outgoing data stream OUT1 to determine the destination node address and the selected virtual route that data stream OUT1 will traverse from the source node (host computer 10 in FIG. 1) to the destination node (remote front-end processor 16 in FIG. 1). In a communications network more complex than the communications network 11 illustrated in FIG. 1, there may be several different physical routes which interconnect the source node with the destination node.

Figure 4:
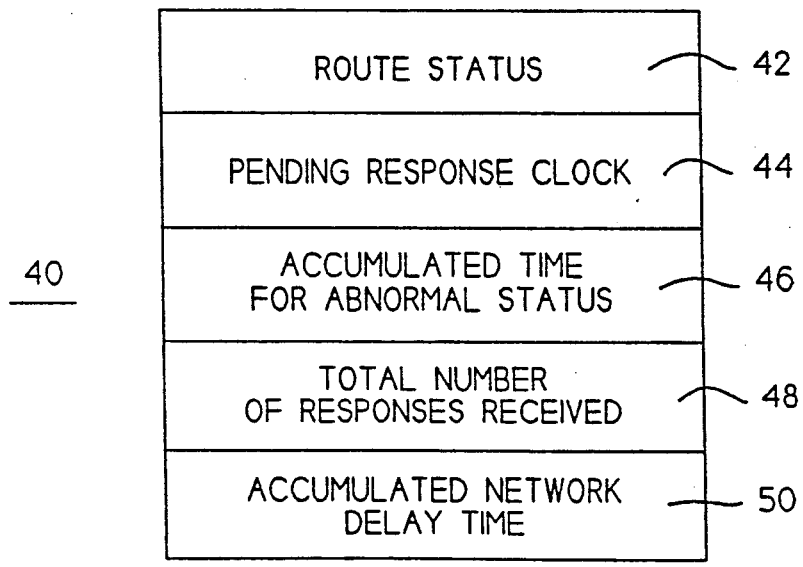
FIG. 4 illustrates a route status block constructed according to the teachings of the present invention.

Program control continues with step 101 where a route status block is located. The route status block 40, illustrated in FIG. 4, is a data structure that the monitor program 30 builds in memory (not shown) the first time that it intercepts an outgoing data stream OUT1 for a particular virtual route.

A route status block 40 is built for each virtual route in the communications network 11. The first entry 42 in the route status block 40 of FIG. 4 stores a status of the virtual route. This status can be either "normal" or "abnormal." A normal route status indicates that data flow between the source node and the destination node over the selected virtual route is currently normal. An abnormal route status indicates that an internal buffer overflow condition in the destination node is preventing data buffers from being transmitted on that particular virtual route. The second entry 44 in the route status block 40 stores the "pending response clock" which is the time of day when the last request for a response for this virtual route was issued. The third entry 46 in the route status block 40 stores the accumulated time that the virtual route has been in an abnormal status condition. This field is updated each time that a response is received that changes the route status from abnormal to normal. The accumulated time is cleared at the end of a period of time which is user definable. The fourth entry 48 in the route status block 40 stores the total number of responses RSP1 received during the user definable period of time. The fifth entry 50 in the route status block 40 stores the total accumulated network delay time for this virtual route during the user definable time period.

Program control continues with step 102 where the monitor program 30 interrogates the communications program 29 in order to obtain the current route status for the selected virtual route. The current route status indicates whether the virtual route is in a normal or abnormal condition. When the route status is abnormal, outgoing data stream OUT1 cannot be transmitted. This status is referred to as the "held" status. The communications program 29 also provides to the monitor program 30 a data item representing the number of additional data buffers that communications program 29 may send before requesting a response from the destination node. This data item is called the "residual window count." Monitor program 30 also interrogates communications program 29 to determine the number of outbound buffers that can be sent as a group before requesting a response. This number is called the "window size," as described earlier. Those skilled in the art will recognize that the means used by the communication program 29 to obtain and update each of these data items is dependent on such things as the design of the host computer 10 and the communications program 29.

The communications program 29 is responsible for decrementing the "residual window count" by one each time that a data buffer which does not request a response is transmitted. The communications program 29 re-initializes the residual window count to the sum of the current value of the "residual window count" and the window size when a response RSP1 from the destination node is received.

The monitor program 30, in step 103, updates the route status field 42 in the route status block 40 with the route status obtained from communications program 29. Program control continues with step 104.

In step 104, the monitor program 30 determines whether intercepted outgoing data stream OUT1 will request a response from the destination node. The monitor program 30 makes this determination by examining the residual window count which was obtained from the communications program 29 in step 102. A residual window count of zero, while the route status is normal, indicates that the current window is exhausted and therefore the next outgoing data stream OUT1 must request a response. Also, a residual window count equal to the window size indicates that the communications program 29 has transmitted a number of data buffers equal to the window size without requesting a response and, therefore, it must request a response with the next outgoing data stream OUT1. If the determination is made in step 104 that a response will not be requested, there is no more processing required for data stream OUT1 by the monitor program 30 and, therefore, control is passed from the monitor program 30 to the communications program 29 in step 105.

If the determination is made in step 104 that a request for a response will be initiated, the monitor program 30, in step 106, stores the current time of day in the "pending response clock" entry 44 in the route status block 40 for the selected virtual route. Program control is then transferred from the monitor program 30 to the communications program 29 in step 107.

The processing of outgoing data stream OUT1, as just described, applies to a communications network 11 using the virtual route pacing technique. The processing of outgoing data stream OUT1 in a communications network 11 using the session level pacing technique differs in several respects. The route status block 40 may be simplified by omitting entries for the route status 42, "pending response clock" 44 and accumulated time for abnormal status 46. Thus, the virtual route status and accumulated time for abnormal status will not be stored. A session status block (not shown) will be built in memory (not shown) the first time that an outgoing data stream OUT1 is detected for a particular session. One entry in this session status block (not shown) is for the "pending response clock" which is the time of day when the last request for a response for the session was issued. The flow chart of FIG. 2 will be modified so that in step 101 the monitor program 30 locates the session status block as well as the route status block. Steps 102 and 103 would be eliminated. In step 104, the monitor program 30 would determine whether outgoing data stream OUT1 will request a response by examining a message header (not shown). If a response is not requested and a response is not pending for this session, then the monitor program 30 may modify the message header (not shown) to request a response. The number of outgoing data streams OUT1 so modified is determined according to a user selected sampling rate. If a response is requested, the monitor program 30 stores the current time of day in the "pending response clock" entry in the session status block.

The general processing by the monitor program 30 for incoming response RSP1, shown in FIG. 1, is illustrated in FIG. 3. In step 110, the monitor program 30 scans the incoming response RSP1 by scanning the message header (not shown) to determine the destination node address from which the response RSP1 was transmitted and the virtual route that this response RSP1 has travelled. Typically, the communications program 29 routine that handles incoming data streams IN1 will also handle incoming responses RSP1. The monitor program 30, in step 111, will locate the route status block 40 for the virtual route indicated.

Program control continues with step 112, where the virtual route network delay is calculated as the difference between the current time of day and the time of day when the outgoing data stream OUT1 requesting this response RSP1 was transmitted. The time when the outgoing data stream OUT1 requesting RSP1 was transmitted is saved in the "pending response clock" entry 44 in the route status block 40 for the indicated virtual route. The "pending response clock" entry 44 in the route status block 40 is reset to zero. This calculated virtual route network delay between the source node and the destination node is accumulated in the entry 50 in the route status block 40 for total accumulated network delay time. The entry 48 for total number of responses received is incremented. Inter-nodal network delays between adjacent intermediate nodes or between an intermediate node and an adjacent destination node may be determined by calculating a difference between the transmission delay between the source node and one of the adjacent nodes (when acting as a destination node) and the transmission delay between the source node and the other of the adjacent nodes (when acting as a destination node). The data stored in the route status block 40 may be displayed to a user in various forms. The virtual route network delay as calculated above is a slightly underestimated value since the response RSP1 traverses the virtual route at a higher priority than the data traffic.

In step 113, a determination is made as to whether the route status 42 saved in the route status block 40 for the indicated virtual route is "normal." If the saved route status 42 is "normal," the response RSP1 is passed on to the communications program 29 for continued processing in step 114. If the route status 42 saved in the virtual route status block 40 is "abnormal," program control is transferred to step 115 where the amount of time that the route was in the "abnormal" state is computed as the difference between the current time of day and the time of day when the outbound data stream OUT1 requesting a response was transmitted. This time is accumulated in the route status block entry 46 for the accumulated time that the virtual route has been in the "abnormal" condition. This time will represent the accumulated length of time that the route is not operational and will, therefore, provide an indication of its impact on response times for the indicated virtual route in the communications network 11.

Program control continues with step 116, where the route status 42 in the route status block 40 is updated to normal. The response RSP1 is then passed on to the communications program 29 for continued processing in step 117. The communications program 29 will update the residual window count for the virtual route and if the route was in the "abnormal" status condition the status will be changed to "normal." Outbound data streams OUT1 stored in a queue (not shown) will be scheduled for transmission to the communications network 11.

The processing of incoming response RSP1, as just described, applies to a communications network 11 using the virtual route pacing technique. The processing of incoming response RSP1 in a communications network 11 using the session level pacing technique differs in several respects. In step 112, the "pending response clock" is stored in the session status block (not shown) as opposed to the route status block 40. The network delay calculated in step 112 will be slightly more accurate than the network delay calculated using the virtual route pacing technique because a session level pacing response travels through the communications network 11 at the same priority as data traffic. Steps 113, 114, 115 and 116 would be eliminated.

While the present invention has been described in connection with an exemplary embodiment thereof, it will be understood that many modifications and variations will be readily apparent to those of ordinary skill in the art. This disclosure and the following claims are intended to cover all such modifications and variations.

What is claimed is:

1. A system for measuring transmission delays in a communications network interconnecting a source node, a destination mode and a plurality of intermediate nodes such that a communications path between the source node and the destination node including any intermediate nodes forms a route, said system comprising:

means in the source node for requesting a response from the destination node;
    means in the destination node for transmitting said response to the source node;
    means in the source node for receiving said response from the destination node;
    means in the source node for determining an issue time at which said request is issued by the source node;

means in the source node for determining a receipt time at which said response is received by the source node;

means in the source node responsive to said issue time and said receipt time for determining a transmission delay along the route;

means in the source node for determining a status of the route responsive to said means for receiving; and means in the source node for accumulating a time during which the route is in a predetermined status.

2. The system of claim 1 wherein the source node is a host computer, each of the intermediate nodes is a microprocessor-based system and the destination node is a microprocessor-based system.

3. The system of claim 2 wherein said means for determining said transmission delay includes means for calculating a difference between said issue time and said receipt time.

4. The system of claim 3 wherein said means for determining said transmission delay includes means for determining said transmission delay between the source node and the destination node.

5. The system of claim 1 wherein said means for accumulating includes means for accumulating said transmission delays for the route when said status is such that no data can be transmitted over the route.

6. The system of claim 5 additionally comprising means for determining an intermediate transmission delay between any two adjacent nodes.

7. The system of claim 6 wherein said means for determining said intermediate transmission delay includes means for calculating a difference between said transmission delay between the source node and a first one of said adjacent nodes and said transmission delay between the source node and a second one of said adjacent nodes.

8. The system of claim 2 wherein said means for determining an issue time and said means for determining a receipt of time intercept data being passed between an application program running in the host computer and a communications program running in the host computer.

9. A method for measuring transmission delays in a communications network interconnecting a source node, a destination node and a plurality of intermediate nodes such that a communications path between the source node and the destination node including any intermediate nodes forms a route, said method comprising the step of:

requesting a response from the destination node;

receiving a response from the destination node;

determining an issue time at which said request is issued by the source node;

determining a receipt time at which said response is received by the source node;

determining, in response to said issue time and said receipt time, a transmission delay along the route;

determining a status of the route in response to said step for receiving; and accumulating a time during which the route is in a predetermining status.

10. The method of claim 9 wherein said step of determining said transmission delay includes the stop of calculating a different between said issue time and said receipt time.

11. The method of claim 10 wherein said step of determining said transmission delay includes the step of determining said transmission delay between the source node and the destination node.

12. The method of claim 9 wherein said step of accumulating includes the step of accumulating said transmission delays for the route when said status is such that no data can be transmitted over the route.

13. The method of claim 12 additionally comprising the step of determining an intermediate transmission delay between any two adjacent nodes.

14. The system of claim 13 wherein said step of determining said intermediate transmission delay includes the step of calculating a difference between said transmission delay between the source node and a first one of said adjacent nodes and said transmission delay between the source node and a second one of said adjacent nodes.

* * * * *

UNITED STATES PATENT AND TRADEMARK OFFICE
CERTIFICATE OF CORRECTION

PATENT NO. : 5,095,444
DATED : March 10, 1992
INVENTOR(S) : Luis Motles

It is certified that error appears in the above-indentified patent and that said Letters Patent is hereby corrected as shown below:

On the Title page, item [57], in the Abstract, line 10, delete "determined" and substitute --determined-- therefor.
Column 6, line 23, delete "communication" and substitute --communications-- therefor.
Column 8, line 55, delete "mode" and substitute --node-- therefor.
Column 9, line 40, delete "of".
Column 10, line 22, delete "different" and substitute --difference-- therefor.

Signed and Sealed this

Fifteenth Day of June, 1993

Attest:

MICHAEL K. KIRK

Attesting Officer

Acting Commissioner of Patents and Trademarks